(12) United States Patent
Livi

(10) Patent No.: US 7,967,596 B2
(45) Date of Patent: Jun. 28, 2011

(54) METHOD, SYSTEM AND EQUIPMENT FOR MAKING PARTS MADE OF COMPOSITE MATERIAL, IN PARTICULAR REINFORCED PARTS FOR AIRCRAFT FUSELAGES

(75) Inventor: Francesco Livi, Rivoli (IT)

(73) Assignee: Alenia Aeronautica S.p.A., Turin (IT)

( * ) Notice: Subject to any disclaimer, the term of this patent is extended or adjusted under 35 U.S.C. 154(b) by 276 days.

(21) Appl. No.: 12/306,493

(22) PCT Filed: Jun. 27, 2007

(86) PCT No.: PCT/IB2007/052495
§ 371 (c)(1),
(2), (4) Date: Dec. 23, 2008

(87) PCT Pub. No.: WO2008/023293
PCT Pub. Date: Feb. 28, 2008

(65) Prior Publication Data
US 2009/0250165 A1   Oct. 8, 2009

(30) Foreign Application Priority Data
Jun. 28, 2006   (IT) .............. TO2006A0477

(51) Int. Cl.
*A01J 21/00* (2006.01)
*B28B 5/00* (2006.01)
*B29C 44/34* (2006.01)
(52) U.S. Cl. ............. 425/388; 425/DIG. 60; 264/241; 264/553; 264/554; 264/571; 521/142
(58) Field of Classification Search .............. None
See application file for complete search history.

(56) References Cited

U.S. PATENT DOCUMENTS

| | | | |
|---|---|---|---|
| 2,441,097 A | 5/1948 | Hicks | |
| 4,255,221 A | 3/1981 | Young | |
| 5,328,540 A | 7/1994 | Clayton et al. | |
| 5,786,403 A * | 7/1998 | Okada et al. | 521/134 |

(Continued)

FOREIGN PATENT DOCUMENTS
EP    1 162 055 A    12/2001
(Continued)

OTHER PUBLICATIONS
About EPT Sealer (Japanese), NITTODENKO, Sep. 2, 2004.*
(Continued)

*Primary Examiner* — Christina Johnson
*Assistant Examiner* — Benjamin Schiffman
(74) *Attorney, Agent, or Firm* — Sughrue Mion, PLLC

(57) ABSTRACT

The present invention relates to a system to manufacture composite material parts comprising a supporting mandrel having at least one compacting zone configured to contain at least one composite material element to be compacted by applying a certain degree of vacuum. The system comprises also at least one compacting equipment comprising a frame having a plurality of interconnected arms along a predetermined perimeter, at least one vacuum bag attached to a side of the frame along its perimeter and configured to compact the element, at least one porous material attached to the vacuum bag along the frame's perimeter and configured to adhere in a removable way to the compacting zone and to impede the air influx during the compacting of element. The invention also relates to a compacting equipment and to a method to manufacture composite material parts.

14 Claims, 4 Drawing Sheets

U.S. PATENT DOCUMENTS

| | | | |
|---|---|---|---|
| 6,312,247 B1 * | 11/2001 | Kassuelke et al. | 425/504 |
| 6,558,608 B2 * | 5/2003 | Haraldsson et al. | 264/516 |
| 6,723,272 B2 * | 4/2004 | Montague et al. | 264/510 |
| 2005/0029692 A1 * | 2/2005 | Abe et al. | 264/45.5 |
| 2005/0281980 A1 * | 12/2005 | Cruz et al. | 428/131 |
| 2006/0142405 A1 * | 6/2006 | Kijima | 521/142 |
| 2008/0083493 A1 * | 4/2008 | Ridges et al. | 156/285 |

FOREIGN PATENT DOCUMENTS

| | | |
|---|---|---|
| WO | 87/05557 A1 | 9/1987 |
| WO | 96/19335 A1 | 6/1996 |
| WO | 00/44543 A1 | 8/2000 |

OTHER PUBLICATIONS

About EPT Sealer (English), NITTODENKO, Nov. 20, 2008.*

* cited by examiner

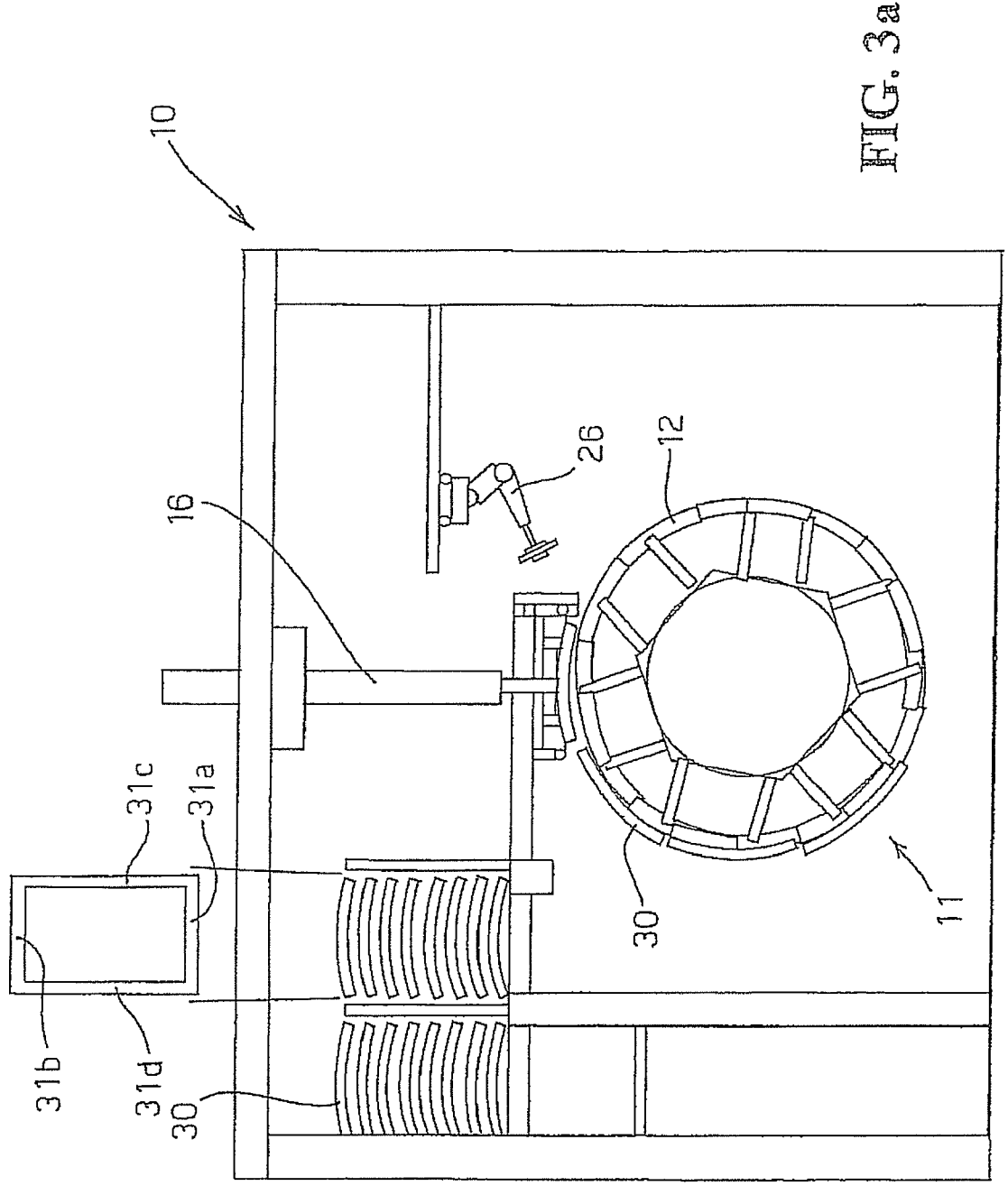

METHOD, SYSTEM AND EQUIPMENT FOR MAKING PARTS MADE OF COMPOSITE MATERIAL, IN PARTICULAR REINFORCED PARTS FOR AIRCRAFT FUSELAGES

TECHNICAL FIELD

The present invention relates, in general, to a method to manufacture components made of composite materials, to a system comprising equipment to manufacture composite material components and to the equipment to manufacture those components. In particular, the present invention relates to a method, system and equipment to manufacture cylindrical components, assembled to obtain an aircraft's fuselage.

To simplify the description, unless specified otherwise, from now on it will be referred as a method and system to manufacture cylindrical parts (fuselage parts) to be assembled to obtain an aircraft's fuselage.

RELATED ART

It is known, that one way to improve the aircraft's performance is to use composite materials, for example, materials made of carbon fibers, that have, in general, the characteristic to associate a great rigidity to a low specific weight.

The introduction of composite materials to the manufacturing of fuselage components requires methods and systems particularly complex and highly labor-intensive.

Referring to a fuselage's section, this part comprises reinforcing elements (stringers) 21 (FIG. 1 and FIG. 2) and a protective layer placed on a substantially cylindrical surface, even though other shapes are possible, bonded to the stringers after polymerization.

According to the known art, for example, the stringers 21, made of non-polymerized composite material, are mounted on a mandrel 11 of a substantially cylindrical structure, and compacted over a plurality of compacting zones 12 using vacuum bags 15, mounted and manually secured on the compacting zones of the mandrel 11. After the compacting of the stringers, a composite material fabric is placed over the stringers, followed by further compacting using vacuum bags 15 mounted and manually secured, and lastly the polymerization is done by placing, for example, the stringers and the fabric inside an oven.

The first typical problem of the known art is that the stringers compacting phase, requiring the manual mounting of the vacuum bags 15 and their securing to the compacting zone 12 using a manually applied sealer, beside having particularly elevated costs, causes also an inconsistent level of quality, which depends on the skill level of the individual operators that effectuate the manual operations of mounting and securing the vacuum bags.

A second problem of the known art is that the compacting is followed by the destruction of the vacuum bags 15.

In fact, because the vacuum bags 15 are glued to the first compacting zone, they can only be destroyed when removed.

DESCRIPTION OF THE INVENTION

The scope of the present invention is a method and a system to manufacture composite material parts that do not require manual labor for the compacting phase of the stringers and/or for the compacting of the layer of fabric covering the fuselage on the stringers.

The scope of the present invention is also a system and equipment that do not require the destruction of the vacuum bags after their use.

The scope is achieved by the method and system to manufacture composite material parts, particularly reinforced parts for aircraft's fuselage, as claimed.

The claims are an integral part of the technical teaching regarding the invention.

According to a preferred embodiment, the system comprises at least one compacting equipment which includes a vacuum bag designed to be applied in a removable manner to the compacting zones on the mandrel to compact the composite material parts not yet polymerized.

According to a further feature of the present invention, the compacting equipment comprises a frame having on one side, to be in contact with the mandrel, a porous material having the characteristics of blocking the air flow in the compacting zone.

According to another feature of the present invention, the frame of the compacting equipment comprises a connector, eventually equipped with a non-return valve, to which connect the vacuum pump generating the vacuum inside the compacting zone.

BRIEF DESCRIPTION OF THE DRAWINGS

This and other features of the present invention will be clear from the following description of the preferred embodiment of the invention, documented as an example and not as a limitation, with the support of the attached drawings wherein elements labeled with the same number or similar numeric reference indicate components having the same or similar function, and wherein:

FIG. 3a is a schematic representation of a system to manufacture the composite material for fuselage components according to the invention;

DESCRIPTION OF THE PREFERRED EMBODIMENT

Figure 1:
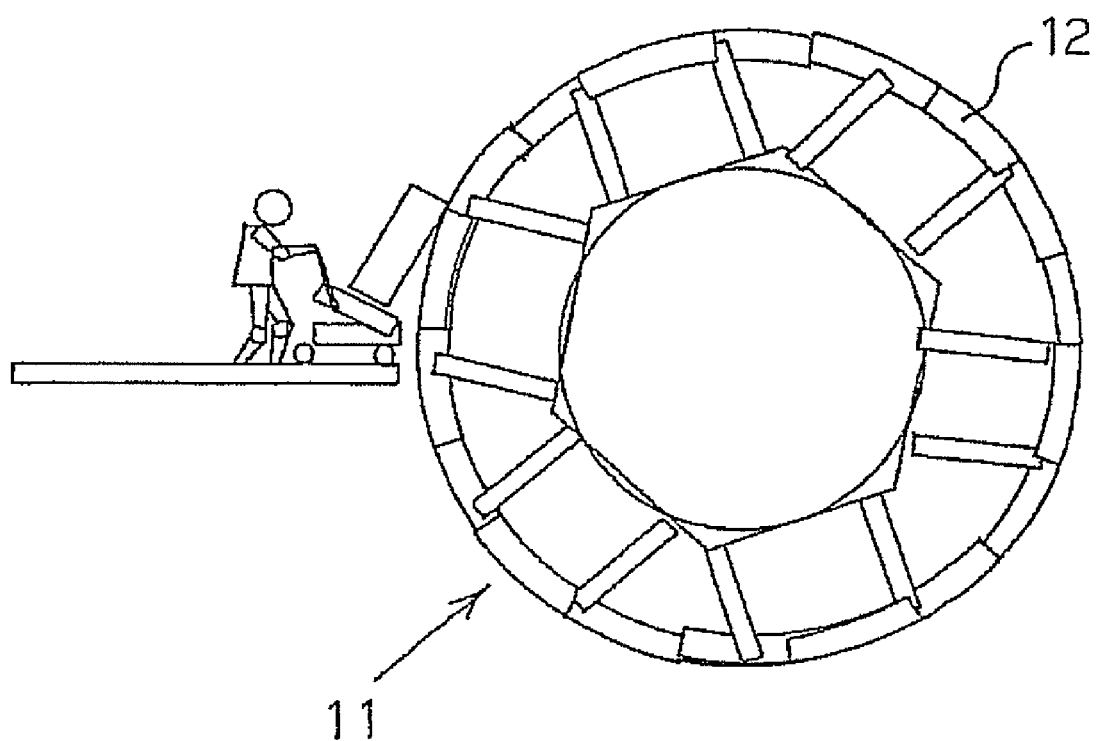
FIG. 1 is a schematic representation of a system to manufacture composite material fuselage components, according to the known art.
Figure 2:
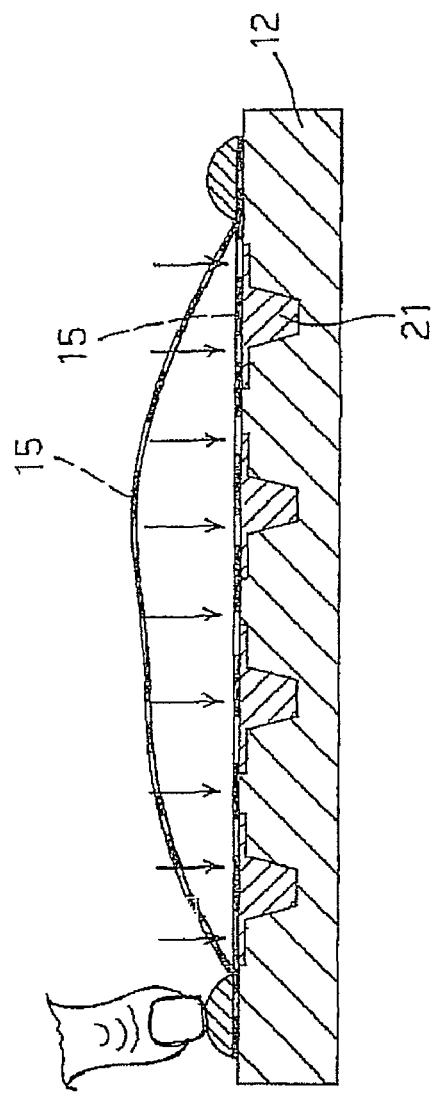
FIG. 2 is a schematic representation of an application phase of the vacuum bags according to the known art.
Figure 3B:
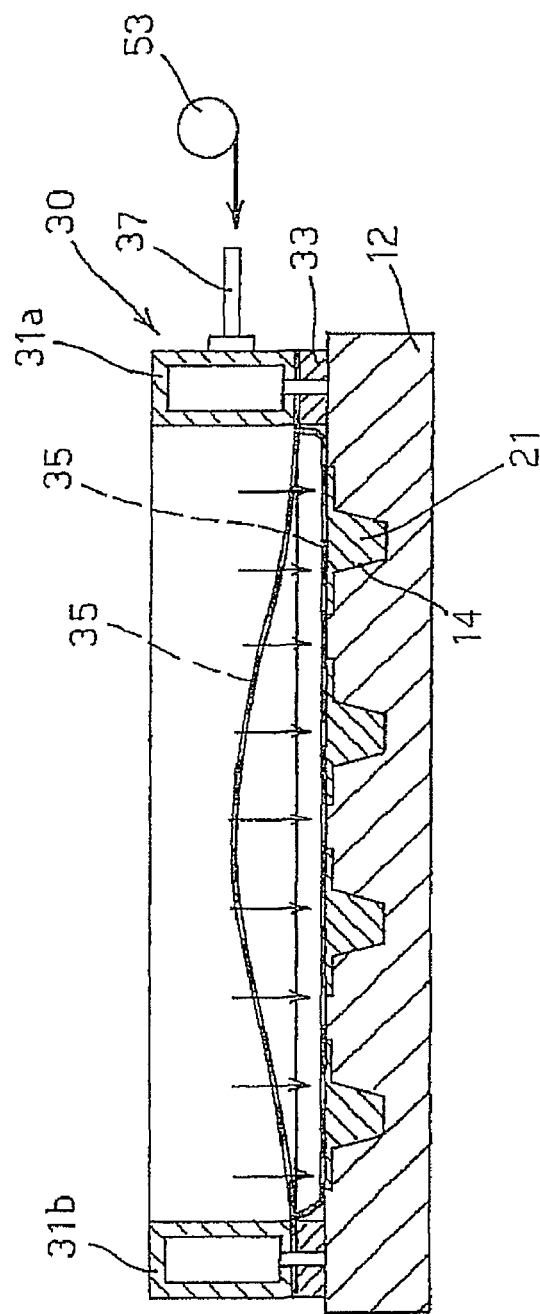
FIG. 3b is a schematic representation of a phase of the vacuum bags application according to the invention.

With reference to FIGS. 3a and 3b, a system 10 to manufacture composite material parts, particularly reinforced parts with stringers 21 of composite material, comprises, for example, a mandrel or polymerization tool 11 and a plurality of equipment or compacting tools 30.

The system 10 according to its preferred embodiment, comprises also, a first numeric-controlled machine 16 configured to retrieve the compacting equipments from a storage area and to position them on the mandrel 11, as it will be described further in more details.

The mandrel 11 can rotate around its own axis, continuously or according to predetermined angles, and show in the upper area, at least one compacting zone 12.

The compacting zone 12 comprises one or more slots 14, eventually in a different number among different areas, configured to hold, for example, the stringers 21.

The shape, dimensions and the number of slots 14 can vary considerably, according to the type of the reinforced parts to produce.

In case of an aircraft's fuselage, the number of slots in a compacting zone can be, for example, ten or twelve.

The stringers 21, made of composite material, such as non-polymerized (not cured) carbon, thanks to the fact they are not yet polymerized, have the characteristic of being deformed to take the slots' shape after being inserted into the slots 14. Preferably, the stringers 21 are positioned inside the respective slots using a second numeric-controlled machine 26 designed to retrieve the stringers from a stringers storage area and position them in the slots 14 inside the compacting zone that at interval times is presented on the upper area of the mandrel 11.

In other embodiments, the stringers can also be positioned manually inside the slots.

The compacting tools 30, according to the preferred embodiment of the invention, are in a number to "cover" the entire mandrel 11, but, naturally, in other embodiments, they can also be in a lower number.

Figure 4:
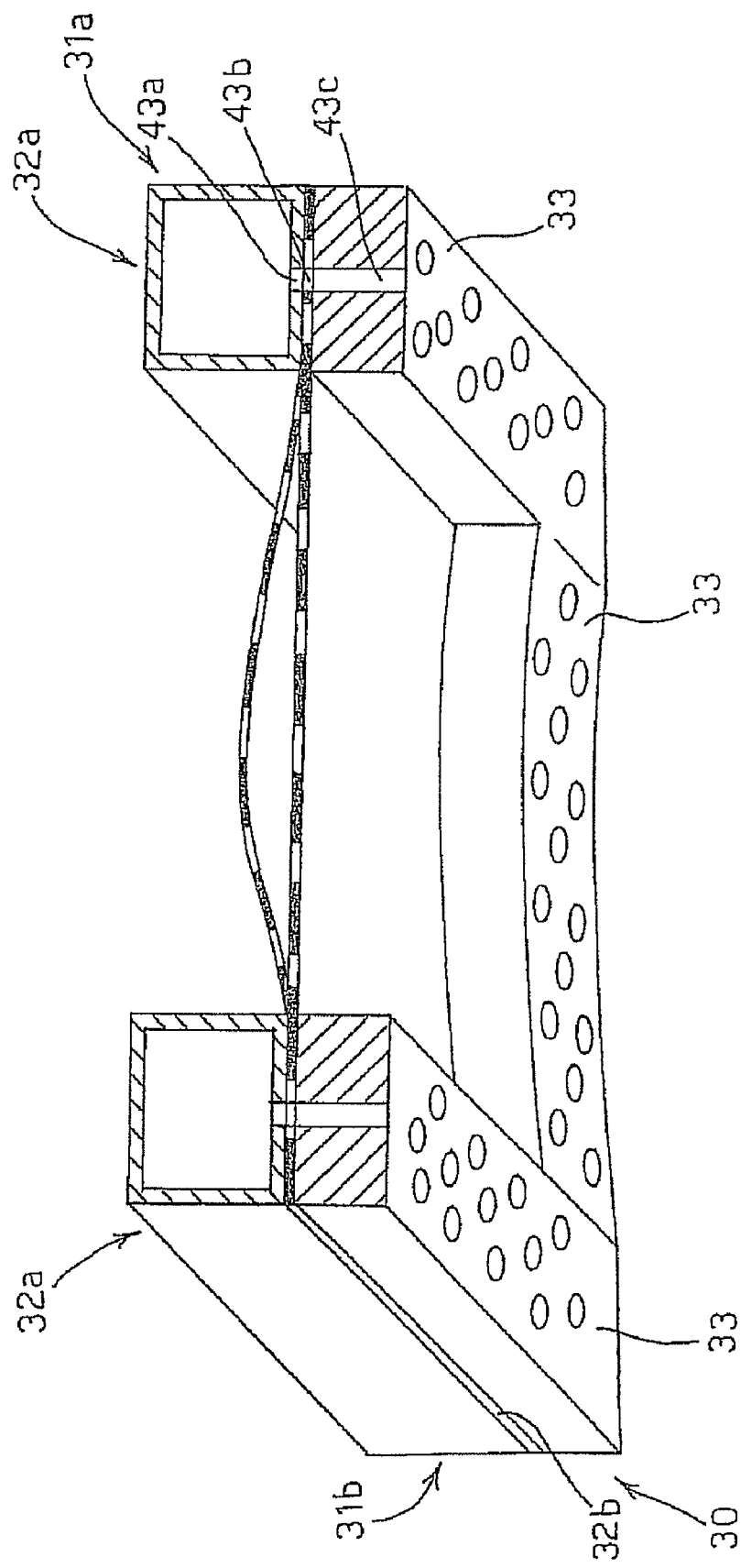
FIG. 4 is a schematic representation of an automated equipment for the vacuum bags application according to the invention.

Every compacting tool 30 (FIG. 4) comprises preferably, a frame 31, for example a rectangular steel frame, having an upper side 32a and a lower side 32b, two straight arms, respectively 31a and 31b, and two arms, respectively 31c and 31d, curved according to a curving radius slightly bigger than the radius of the mandrel 11 (FIG. 3a, FIG. 3b, FIG. 4).

Naturally, according to other embodiments, all arms can be straight, or the frame can be differently shaped, beside being rectangular.

Every frame's arm, from 31a to 31d, has preferably a quadrangular section, comprising a plurality of holes 43a on the lower side and it is configured to create an internal channel communicating with the correspondent internal channels of the other arms.

Preferably, at least one of the arms, for example the arm 31a, comprises a connecting element 37 communicating with the arms' conduits to which to connect a pump 53 (a vacuum pump), of known kind, to generate a vacuum condition. The connecting element can comprise also a non-return valve, of known kind, to stop the air influx inside the frame's conduits, in case the vacuum pump 53 is disconnected.

Preferably, the frame comprises hooking elements of mechanical type, for example dowel pins or hooks, to fasten the compacting equipment 30 to the mandrel 11 inside the compacting zone.

In the preferred embodiment, the lower side 32b of the frame 31 is connected to a layer of porous material 33, for example a semi-closed strip of foam of E.P.D.M type (Ethylene-Propylene-Diene Monomer) NITTO 686 or a foam with substantially similar characteristics.

Between the porous material (foam or strip of foam) 33, in particular between the first side of the foam 33 and the lower side 32b of the frame 31 a vacuum bag is interposed. Said vacuum bag 35 is attached, glued for example, to the first face of the foam 33 and to the lower side 32b of the frame, so that the foam 33, vacuum bag 35 and the frame make one body.

The foam 33 and the vacuum bag 35 have respective holes, 43b and 43c, in correspondence to the holes 43a of the lower side 32b. The foam strip 33, preferably, has the first face connected to the entire perimeter of the lower side 32b of the frame 31 and has a second face configured to become in contact with the compacting zone; the foam has a thickness to compensate possible curving differences between the compacting zone 12 and the curved arms, 31c and 31d, and/or possible irregularities in the compacting zone 12, when the second face of the foam comes in contact with the compacting zone.

In the preferred embodiment, in which the frame has a width of about 2.5 m, a depth comprised between 8 and 16 m, and the mandrel has a curving radius of about 3 m, the foam has a thickness between 20 and 30 mm.

Naturally, in other embodiments, the foam 33 can have a different thickness but still capable to compensate shape differences between the compacting zone 12 and the frame 31. Preferably, the foam 33 has the function, when used, to stop the air influx inside the vacuum bag following the mounting of the vacuum pump 53 to the connecting element 37 and to maintain a predetermined vacuum level in a predetermined area, e.g. the area delimited by the foam 33 of the compacting tool 30 when in contact with the compacting zone 12 on the mandrel 11.

The functioning of the system 10, as previously described, is the following.

In a first phase, the compacting zone 12, positioned in the upper area of the mandrel 11, is loaded, for example, using the second numeric-controlled machine 26, with a number of stringers equal to the number of the slots 14 in the compacting zone 12.

In a second phase, the first numeric-controlled machine 16 retrieves from a storage area a compacting equipment 30 and positions it in correspondence, for example, of the compacting zone 12, to make, thanks to the presence of the foam 33, a kind of sandwich with the inside being the stringers 21.

In a third phase, the pump (53) is applied to the compacting equipment to produce a vacuum in the stringers area. The vacuum force pushes the vacuum bag, as illustrated in FIG. 3b, against the stringers to shape them by making them to take the slots' shapes; the porous foam material applies pressure on the compacting zone 12 surface preventing the air from entering the stringers area.

In a fourth phase, for example, the mandrel 11 is rotated to show the next compacting zone (12) in the upper area. In such a phase, and in the subsequent phases until the completion of the compacting phase of all required stringers, the vacuum pump 53 remains connected to different connecting elements for a predetermined time, for example, the time necessary to shape conveniently the stringers, for example one hour.

After completion of the fourth phase, the compacting procedure restarts from the first phase until the compacting phase completion.

After the compacting phase is completed, the compacting equipment 30 are taken by the first numeric-controlled machine 16 and returned to the storage area for the next use.

The described process can be repeated, with equivalent steps, even after the positioning of the fabric over the stringers, according to the known process.

Thanks to the invention, the vacuum bags are fully reusable.

Furthermore, the use of foam guarantees a constant or better quality level with respect to the known process.

In fact, the inventor has detected with experimentation that the vacuum level that can be obtained with the system and the equipment according to the invention (0.8 $Kg/cm^2$) is better than the one obtained by the manual process, which is about 0.6 $Kg/cm^2$.

This description refers to the manufacturing of parts made of composite material for aircrafts, but it is easily understood that that same procedures can be applied to the manufacturing of body parts made of composite material for high speed vehicles such as trains, high performance cars etc.

Although a mandrel has been chosen for the manufacturing of composite material parts, it is easily understood that the described method is also applicable whenever a rotating mandrel is not present, but the manufacturing of composite material parts simply requires a vacuum bag's use.

The description refers to a compacting equipment to be used only for the compacting phases.

Naturally, in other embodiments, in which, for example, the compacting equipment comprises a vacuum bag and a foam that, although has substantially similar features to the one described, it can be resistant also to high polymerizing temperatures, to allow the equipment to be used during the polymerization phase.

Obvious modifications or variations are possible according to the description above, in the dimensions, shapes, materials, components, as well in the construction details as illustrated and in the operating method without deviating from the spirit of the invention, as defined in the following claims.

The invention claimed is:

1. Equipment to manufacture composite material parts comprising at least one composite material element to be compacted, the equipment comprising:
   a frame having a plurality of arms, interconnected along a determined perimeter, and comprising an upper side and a lower side;
   at least one vacuum bag attached to the lower side of said frame along the determined perimeter of the frame and configured to compact said at least one composite material element; and
   a member attached to the vacuum bag along said determined perimeter of the frame and configured to become in contact in a removable way with a surface, on which the at least one composite material element to be compacted is positioned, to define a compacting zone of said at least one composite material element,
   wherein the arms are configured to create a common internal channel or channels connectable through a connection element to a pump, and comprise a plurality of holes positioned proximate the lower side of the frame,
   the member is comprised of a foam material having semi-closed cells, which are porous in an uncompressed form and not porous in a compressed form,
   the plurality of holes communicates with the foam material through the vacuum bag while an air influx is generated by the pump through the foam material attached along the determined perimeter of the frame, and
   the foam material blocks the air influx when the foam material becomes compressed.

2. A system to manufacture composite material comprising:
   a supporting mandrel having at least one compacting zone, said compacting zone being configured to hold at least one composite material element designed to be compacted by applying a pre-determined vacuum level; and
   at least one piece of equipment according to claim 1.

3. A system according to claim 2, wherein said mandrel has a substantially cylindrical shape with a determined curving radius.

4. A system according to either claim 2 or 3, wherein said frame has a substantially rectangular shape and comprises a first pair of opposing arms having a substantially straight profile and a second pair of opposing arms having a substantially curved profile with a determined curving radius.

5. A system according to claim 4, wherein said determined curving radius of said second pair of opposing arms is greater than said determined curving radius of said mandrel.

6. A system according to claim 2, further comprising:
   a connection element configured to be connected to a pump configured to create a vacuum inside said compacting zone.

7. A system according to claim 2, wherein said arms, said vacuum bag, and said member comprise a plurality of holes aligned with one another along said determined perimeter of the frame.

8. A system according to claim 2, further comprising;
   first numeric-controlled means configured to retrieve said at least one piece of equipment from a storage area and position the at least one piece of equipment on said mandrel.

9. A system according to claim 2, further comprising;
   second numeric-controlled means configured to retrieve said at least one composite material element to be compacted from a storage area and position the at least one composite material element inside said compacting zone.

10. Equipment according to claim 1, wherein said frame has a substantially rectangular shape and comprises a first pair of opposing arms having a substantially straight profile and a second pair of opposing arms having a substantially curved profile with a determined curving radius.

11. Equipment according to claim 1, further comprising:
    a connection element configured to be connected to a pump to create a vacuum inside said compacting zone.

12. Equipment according to claim 11, wherein said connection element comprises a non-return valve.

13. Equipment according to claim 1, wherein said arms, said vacuum bag, and said member comprise a plurality of holes aligned with one another along said determined perimeter of the frame.

14. Equipment to manufacture composite material parts comprising at least one composite material element to be compacted, the equipment comprising:
    a frame having a plurality of arms, interconnected along a determined perimeter, and comprising an upper side and a lower side;
    at least one vacuum bag attached to the lower side of said frame along the determined perimeter of the frame and configured to compact said at least one composite material element; and
    a member attached to the vacuum bag along said determined perimeter of the frame and configured to become in contact in a removable way with a surface, on which the at least one composite material element to be compacted is positioned, to define a compacting zone of said at least one composite material element,
    wherein the arms are configured to create a common internal channel or channels connectable through a connection element to a pump, and comprise a plurality of holes positioned proximate the lower side of the frame,
    the member is comprised of a semi-closed Ethylene-Propylene-Diene Monomer (EPDM) strip material, and
    the plurality of holes communicates with the semi-closed EPDM strip material through the vacuum bag while an air influx is generated by the pump through the semi-closed EPDM strip material attached along the determined perimeter of the frame.

* * * * *